(12) United States Patent
Taniguchi et al.

(10) Patent No.: US 6,232,593 B1
(45) Date of Patent: May 15, 2001

(54) OPTICAL ENCODER

(75) Inventors: Mitsuyuki Taniguchi; Masato Aochi, both of Gotenba (JP)

(73) Assignee: Fanuc Ltd., Minamitsuru (JP)

( * ) Notice: Subject to any disclaimer, the term of this patent is extended or adjusted under 35 U.S.C. 154(b) by 0 days.

(21) Appl. No.: 09/281,229

(22) Filed: Mar. 30, 1999

(30) Foreign Application Priority Data

Apr. 1, 1998 (JP) .................................................. 10-104202

(51) Int. Cl.[7] .............................. G01D 5/34; H03M 1/22; H03K 17/94
(52) U.S. Cl. ......................... 250/231.13; 341/13; 341/31
(58) Field of Search ........................ 250/231.13, 231.14, 250/231.15, 231.16, 231.17, 231.18; 356/373, 375; 33/707; 341/11, 13, 31

(56) References Cited

U.S. PATENT DOCUMENTS 4,536,650 * 8/1985 Carena et al. ................... 250/231.14
5,124,548 * 6/1992 Igaki ................................. 250/231.16

FOREIGN PATENT DOCUMENTS

| 58-106413 | 6/1983 | (JP) | G01D/5/26 |
| 62-5130 | 1/1987 | (JP) | G01D/5/36 |
| 3-59417 | 3/1991 | (JP) | G01D/5/38 |
| 3-267720 | 11/1991 | (JP) | G01D/5/38 |
| 5-118877 | 5/1993 | (JP) | G01D/5/34 |
| 8-233608 | 9/1996 | (JP) | G01D/5/30 |
| 9-89593 | 4/1997 | (JP) | G01D/5/30 |
| 9-264712 | 7/1997 | (JP) | G01B/11/00 |

* cited by examiner

Primary Examiner—Georgia Epps
Assistant Examiner—David N. Spector
(74) Attorney, Agent, or Firm—Staas & Halsey LLP

(57) ABSTRACT

A movable code plate for an optical encoder is given a light path changing function by forming a series of indentations in one or more portions of one surface of the plate. Since these indentation are sufficiently shallow with respect to the thickness of the movable code plate, sufficient strength of the movable plate is maintained. These indentations can be formed on the surface of the movable code plate without a high accuracy. These indentations may be V-shaped grooves or matted surfaces.

20 Claims, 14 Drawing Sheets ents (omitted from drawing) and photorecptor elements
OPTICAL ENCODER

BACKGROUND OF THE INVENTION

1. Field of the Invention

The present invention relates to an optical encoder having an improved structure for the optical detecting section thereof.

2. Description of the Related Art

Optical encoders include rotary type encoders which detect the position and speed of a rotational moving object, such as a motor, or the like, and linear type encoders which detect the position and speed of a linear moving object. Of these, one example of an encoder used widely as a rotary type optical encoder is now described with reference to FIG. 23.

A movable code plate 100 is made from a glass plate onto which chrome has been vapour deposited, or a metal plate, such as stainless steel, nickel, copper, or the like, and light transmitting sections 101a, 101b are formed by etching in portions of ring-shaped regions scanned by a light-emitting element (omitted from drawing) of a light source 1. The areas outside the light transmitting sections 101a, 101b form light shielding sections.

A light source 1 and a light receiving section 2 are provided on either side of the movable code plate 100. The light source 1 and light receiving section 2 are constituted respectively by a prescribed number of light-emitting elements (omitted from drawing) and photorecptor elements 21, 22. When a light transmitting section 101a, 101b is positioned in front of the photoreceptor elements 21, 22, light projected from the light source 1 to the movable code plate 100 is transmitted by the light transmitting section 101a, 101b and enters the corresponding photoreceptor element 21, 22, and a signal representing the received light is output by the photoreceptor element 21, 22.

The movable code plate 100 is installed on a rotating shaft 3 (the object of which the rotational position or speed is to be detected), and when it rotates about the axis of the rotating shaft 3, a light reception signal is output periodically by the photoreceptor elements 21, 22. By processing this light reception signal by means of a commonly known type of circuit, which is omitted from the drawing, it is possible to detect the rotational position, rotational speed, or the like, of the rotating shaft 3.

When creating the conventional type of optical encoder described above, firstly, a light-shielding film made from chrome, or the like, is formed onto a movable code plate 100, and the light-shielding film is then removed therefrom by etching in a prescribed code pattern. However, since etching uses chemical substances that require labour-consuming management and processing, a problem arises in that manufacturing costs are high and hence this method is not suitable for mass production.

Therefore, in order to resolve the aforementioned problem, it has been proposed that movable code plates can be manufactured by using an opaque resin material and forming transmitting holes in portions of the region scanned by light from a light source. By adopting movable code plates made from resin of this kind, advantages are obtained in that since no harmful chemical substances are used, manufacturing is simple and inexpensive, and good reproducibility is easy to achieve. However, problems arise in that it is difficult to form fine patterns, since adequate strength cannot be achieved, and therefore it is not possible to obtain the high resolution that can be achieved with code plates made from glass or metal.

Furthermore, as a further method of resolving the aforementioned problems associated with movable code plates made from resin, an optical encoder having a light path changing function has been proposed and a patent application has been made for same (Japanese Patent Application No. 11979/1998 issued as Japanese Patent No. 11-201229, U.S. patent application Ser. No. 09/225,516, European Patent Application No. 199990300085). As illustrated in FIG. 24, this optical encoder comprises a movable code plate 110 wherein the ring-shaped region scanned by a light-emitting element (omitted from drawing) of a light source is divided into a first type of region 110a, 110b (regions indicated by hatching in FIG. 24) through which incident light from the light source 1 is transmitted after being bent at least once, and a second type of region through which incident light from the light source 1 is transmitted directly.

A light-receiving section 2 is positioned in such a manner that the state of light reception by photoreceptor elements 21, 22 in the light-receiving section 2 is different in cases where the light from the light-emitting element in the light source 1 is transmitted through the first type of region 110a, 110b on the movable code plate 110, and cases where the light is transmitted through the second type of region.

In the proposed optical encoder described above, the first type of region 110a, 110b is provided by forming a cut-out section 10 (see FIG. 25) in the movable code plate 110. The cut-out section 10 must be formed to a significant depth in order that the light incident on the movable code plate 110 is bent through a prescribed angle. Therefore, when this type of cut-out section 10 is formed in the regions indicated by the hatching in FIG. 24, thus reducing the material thickness in those regions, the strength of the movable code plate 110 declines accordingly.

SUMMARY OF THE INVENTION

It is an object of the present invention to provide an optical encoder having a light path changing function, without impairing the strength of movable code plates. Additional objects and advantages of the invention will be set forth in part in the description which follows and, in part, will be obvious from the description, or may be learned by practice of the invention.

The optical encoder according to the present invention comprises a movable code plate for converting input light to encoded output light, a light source provided with one or more light-emitting element for scanning one or more regions on the movable code plate, and one or more photoreceptor elements for receiving the output light encoded by the movable code plate. Moreover, in order to perform the encoding action, at least one of the regions scanned by the input light is divided into a first type of region and a second type of region generating a first type of output light and a second type of output light having mutually different light paths. At least one of either the first type of region and/or the second type of region comprises a light path changing function whereby the light path of the input light is bent at least once. Furthermore, the one or more photoreceptor elements are positioned in such a manner that a first light reception state is created in at least one of these photoreceptor elements when the input light is incident on the first type of region, and a second light reception state, which is different to the first light reception state, is created therein when the input light is incident on the second type of region. The light path changing function is created by forming a series of indentations which are sufficiently small with respect to the thickness of the movable code plate in one surface of the movable code plate, these indentations being formed in at least one of the first type and/or second type of region.

According to the present invention, adequate strength can be provided in a movable code plate for an optical encoder, and furthermore, it is possible to form movable code plates without requiring metal moulds having high registration accuracy, and it is also possible to manufacture movable code plates without depending on signal frequency.

BRIEF DESCRIPTION OF THE DRAWINGS

The foregoing and other objects and features of the invention will become apparent from the following description of preferred embodiments of the invention with respect to the accompanying drawings, in which.

DESCRIPTION OF THE PREFERRED EMBODIMENTS

Figure 1:
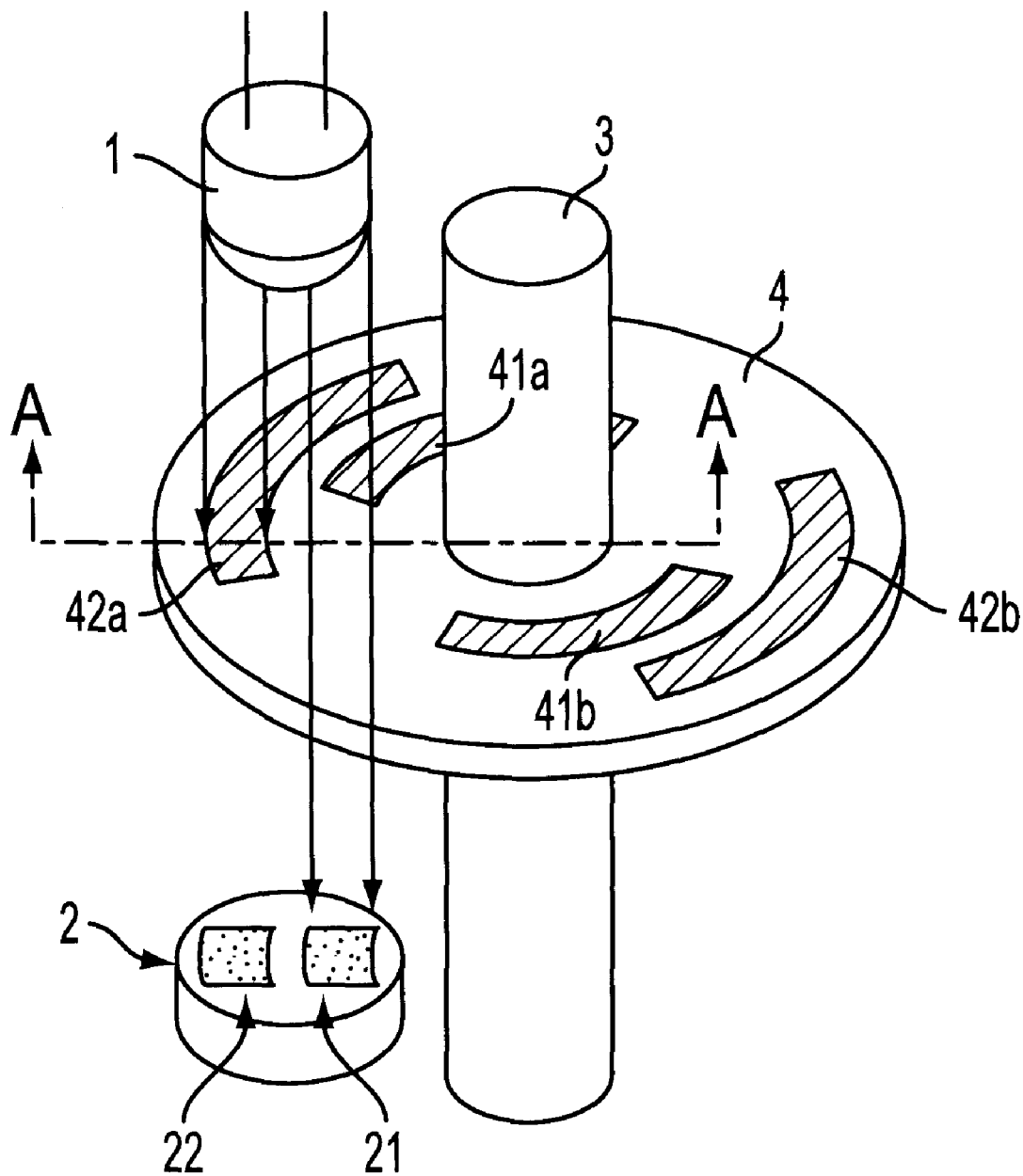
FIG. 1 is a general oblique view showing the principal composition of an optical detecting section of a rotary-type optical encoder relating to a first embodiment of the present invention.

Reference will now made in detail to the present preferred embodiments of the present invention, examples of which are illustrated in the accompying drawings, wherein like reference numerals refer to the like elements throughout. The embodiments are described below in order to explain the present invention by referring to the figures.

A first embodiment of the present invention is now described with reference to FIG. 1 to FIG. 4.

The movable code plate 4 used in the rotary-type optical encoder is made from transparent optical glass or plastic material. On this movable code plate 4, a ring-shaped region containing a plurality of regions 41a, 41b, 42a, 42b indicated by hatching in FIG. 1 is scanned by light output from a light source 1.

A light source 1 and a light-receiving section 2 are provided on either side of the movable code plate 4. The light-receiving section 2 comprises two photoreceptor elements 21, 22. The photoreceptor element 21 is positioned such that it corresponds to regions 41a, 41b, and the photoreceptor element 22 is positioned such that it corresponds to regions 42a, 42b.

The regions 41a, 41b, 42a, 42b in the ring-shaped scanning region of the movable code plate 4 are constituted by forming a continuous plurality of V-shaped grooves which are sufficiently shallow with respect to the thickness of the movable code plate 4 (in other words, of a depth which does not impair the strength of the movable code plate 4), on one side of the movable code plate 4.

Figure 2:
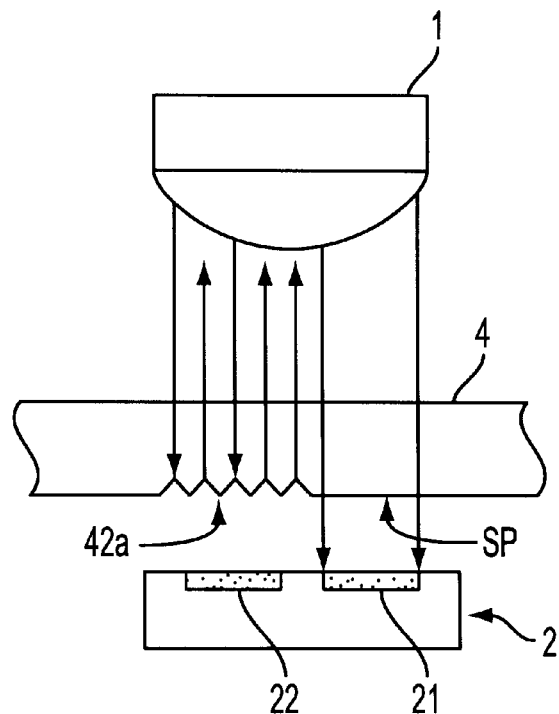
FIG. 2 is a diagram showing an enlargement of a portion of cross section A—A in FIG. 1.

FIG. 2 shows a cross section of region 42a, of the aforementioned regions 41a, 41b, 42a, 42b (hereinafter, referred to as first-type regions). The other regions 41a, 41b and 42b have the same structure as 42a.

Of the ring-shaped scanning region of the movable code plate 4, the portion where V-shaped grooves are not formed, that is, the portion other than the aforementioned first-type region 41a, 41b, 42a, 42b, constitutes a second-type region.

Figure 3:
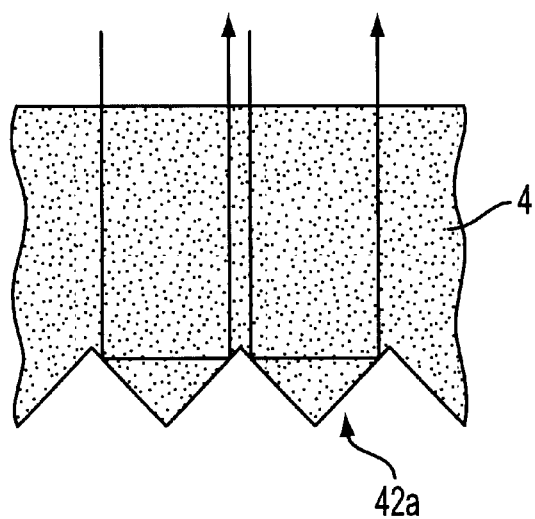
FIG. 3 is an enlarged sectional view of the movable code plate in FIG. 2.

As shown in FIG. 2, light from the light source 1 that is incident on the first-type region 42a (the same applies to regions 41a, 41b, 42b) is fully reflected by the surfaces of the V-shaped groove and returns in the direction of the light source 1, as illustrated in FIG. 3. In other words, the light does not proceed towards the light-receiving section 2. On the other hand, light from the light source 1 that is incident on region sp, which is of a second type (see FIG. 2), is transmitted without alteration and proceeds directly towards the light-receiving section 2.

Figure 25:
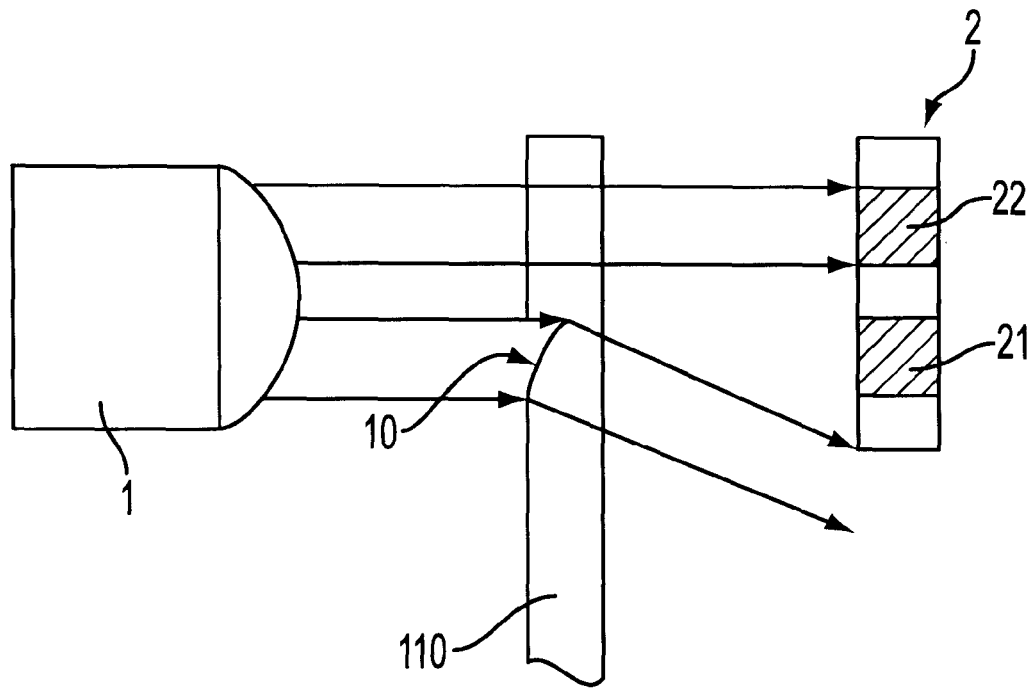
FIG. 25 is a diagram for explaining the light path changing function of the movable plate in the optical encoder in FIG. 24.

Since the first-type regions are obtained by forming a plurality of small V-shaped grooves in a continuous fashion on one side of the movable code plate 4, there is only a slight reduction in the strength of the movable code plate 4 due to forming of the first-type regions, when compared to a case where cut-outs 10 (see FIG. 25) are formed in order to obtain first-type regions as in the prior art.

Figure 4A:
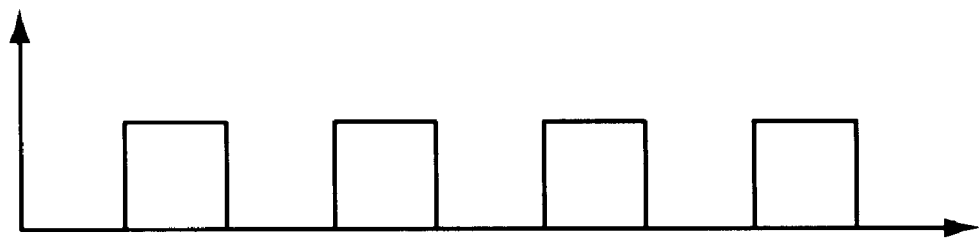
FIG. 4 is an output signal diagram relating to the optical encoder in FIG. 1.
Figure 4B:
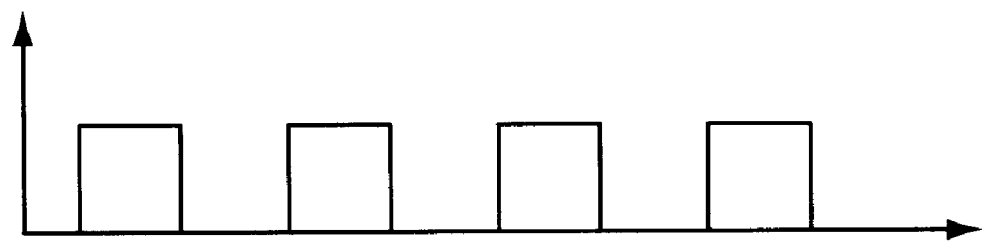

As described above, light incident on the movable code plate 4 from the light source 1 is shielded from passing to the light-receiving section 2 in the first-type regions 41a, 41b, 42a, 42b, whereas it is allowed to proceed to the light-receiving section 2 in the second-type regions, and therefore the outputs of the photoreceptor elements 21, 22 in the light-receiving section 2 are as shown respectively in FIGS. 4(a) and (b). FIG. 4 shows rectangular waveforms which were transformed from triangular waveforms of the photoreceptor elements 21, 22 by a well-known signal processing circuit (not shown). Photoreceptor element 21 and photoreceptor element 22 are positioned such that they correspond respectively to the inner side and the outer side of the region scanned by the output light from the light source 1.

A second embodiment of the present invention is now described with reference to FIG. 5 to FIG. 7.

Figure 5:
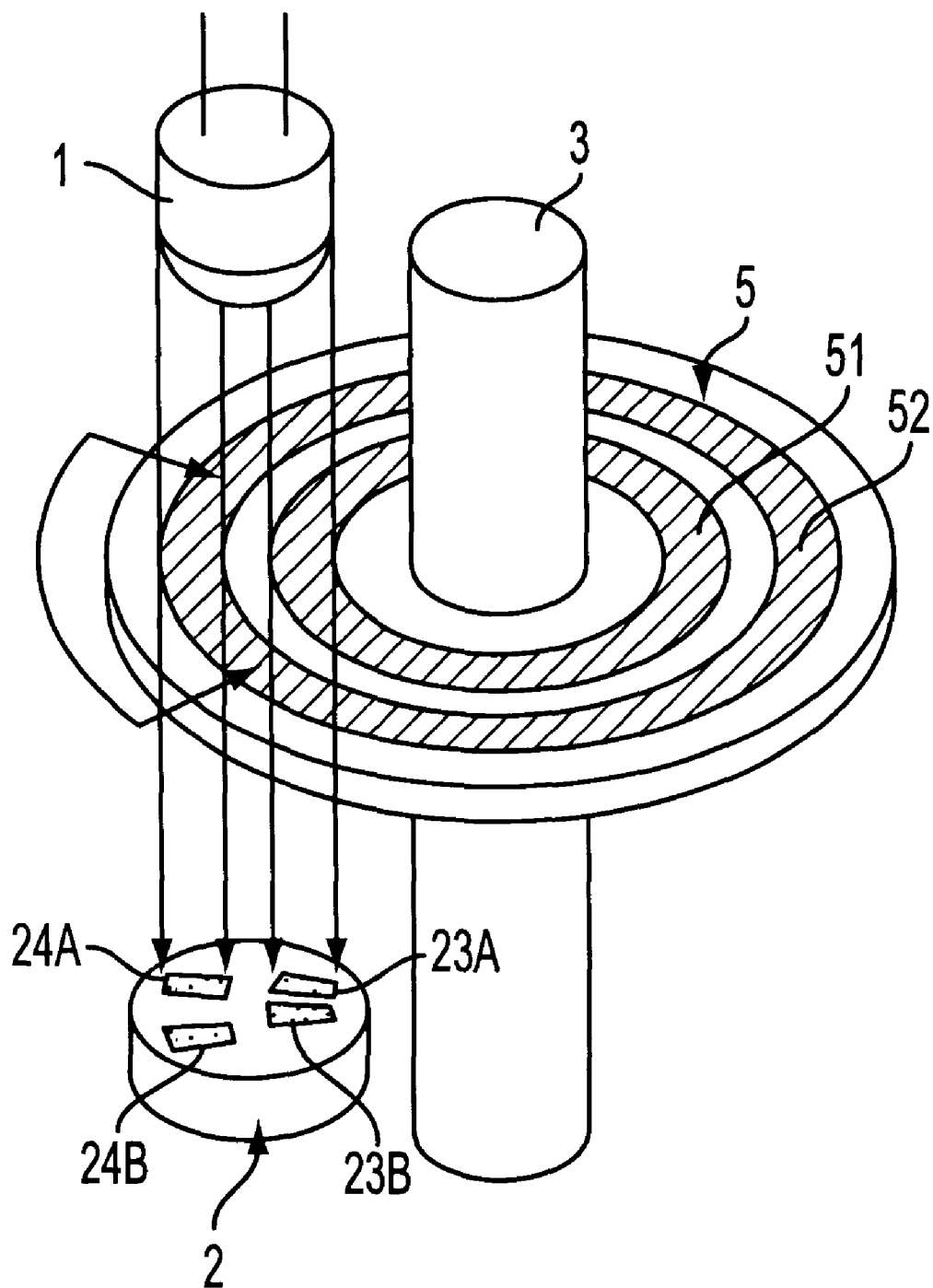
FIG. 5 is an approximate oblique diagram showing the principal composition of an optical detecting section of a rotary-type optical encoder relating to a second embodiment of the present invention.

The region scanned by the light output from the light source 1 covers two ring-shaped regions 51, 52 indicated by hatching in FIG. 5.

The light-receiving section 2 comprises two photoreceptors elements 23A, 23B facing the inner portion of the ring-shaped region 51, and two photoreceptor elements 24A, 24B facing the outer portion of the ring-shaped region 52. The photoreceptor elements 23A, 23B and the photoreceptor elements 24A, 24B are positioned at a prescribed interval from each other in the circumferential direction of the ring-shaped regions 51, 52.

Figure 6:
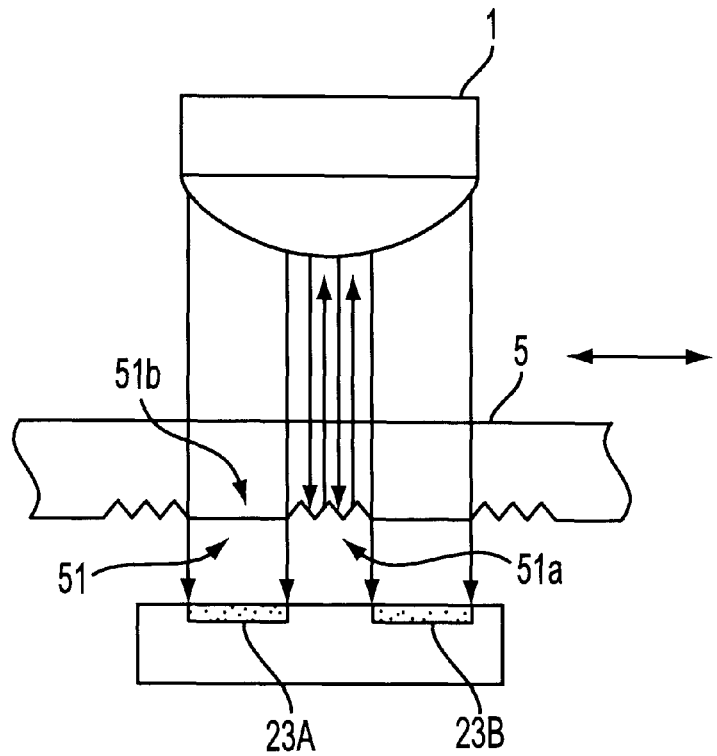
FIG. 6 is a diagram for explaining the light path changing function of the movable code plate in the optical encoder in FIG. 5.

On the other hand, in the ring-shaped region 51 of the movable code plate 5, as illustrated in FIG. 6, a first-type region 51a and a second-type region 51b respectively having the same width as the photoreceptor elements 23A, 23B of the light-receiving section 2 are provided alternately at a prescribed pitch in the scanning direction of the movable code plate 5.

Furthermore, although not shown in the drawings, in the ring-shaped region 52 of the movable code plate 5, a first-type region 52a and a second-type region 52b respectively having the same width as the photoreceptor elements 24A, 24B of the light-receiving section 2 are provided alternately at a prescribed pitch in the scanning direction of the movable code plate 5.

Similarly to the first-type region 42a shown in FIG. 2, a series of V-shaped grooves are formed in the first-type regions 51a, 52a. Similarly to the second-type region 41 shown in FIG. 2, the second-type regions 51b, 52b are areas where no V-shaped grooves are formed. (Incidentally, the regions 52a, 52b are not shown in these drawings.) Consequently, the first-type regions 51a, 52a and the second-type regions 51b, 52b of the movable code plate 5 have a similar function to that of the first-type region 42a and the second-type region 42b of the movable code plate 4 illustrated in FIG. 2.

Figure 7A:
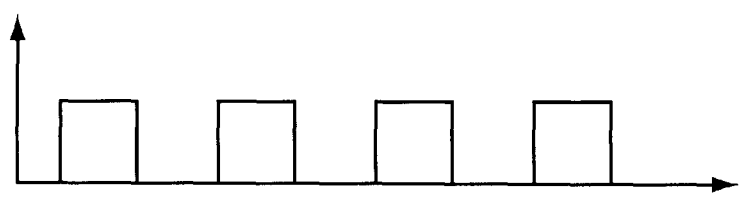
FIG. 7 is an output signal diagram of the optical encoder in FIG. 5.
Figure 7B:
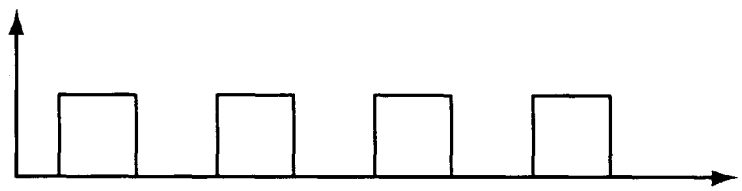

The output of the photoreceptor elements 23A, 23B in the light-receiving section 2 are as shown respectively in FIGS. 7(a) and (b), (similarly to the output of the photoreceptor elements 24A, 24B). FIG. 7 shows rectangular waveforms which were transformed from triangular waveforms of the photoreceptor elements 23A and 23B by a well-known signal processing circuit (not shown).

A third embodiment of the present invention is now described with reference to FIG. 8 and FIG. 9.

In this embodiment, the composition is the same as the second embodiment (FIG. 6), with the exception that the intervals between the photoreceptor elements 23A and 23B (and the photoreceptor elements 24 and 24B) are different. Specifically, whereas in FIG. 6 the interval between the photoreceptor elements 23A and 23B of the light-receiving section 2 is taken as the width of the first-type region 51a plus the width of the second-type region 52b (=1 pitch), in the present embodiment, as shown in FIG. 8, this interval is taken as 1 pitch and a half, meaning that it is half a pitch larger than in the second embodiment.

Figure 8:
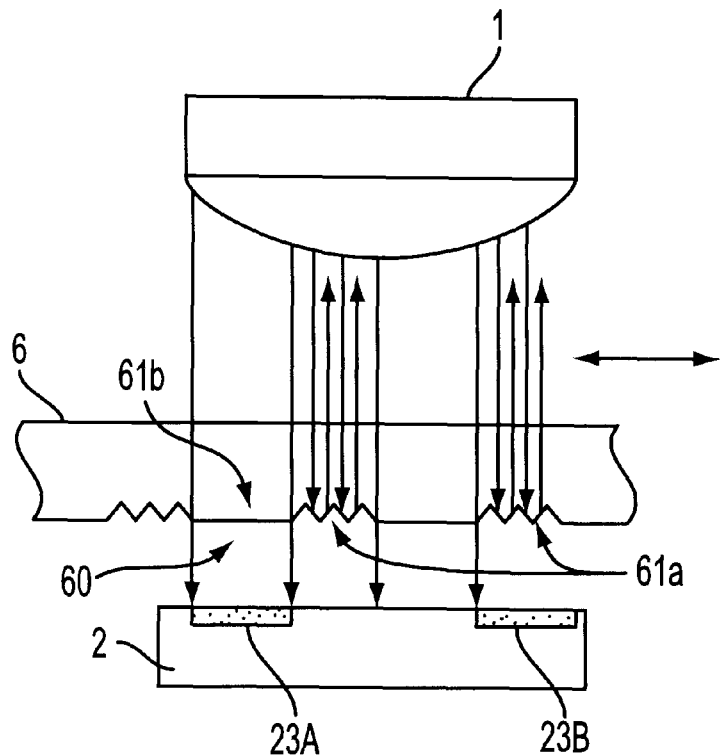
FIG. 8 is a diagram for explaining the light path changing function of a movable plate in a rotary-type optical encoder relating to a third embodiment of the present invention.

Consequently, in this embodiment, as illustrated in FIG. 8, when one of the photoreceptor elements 23A faces the second region 61b and receives light, the other photoreceptor element 23B faces the first region 61a and does not receive light.

Figure 9A:
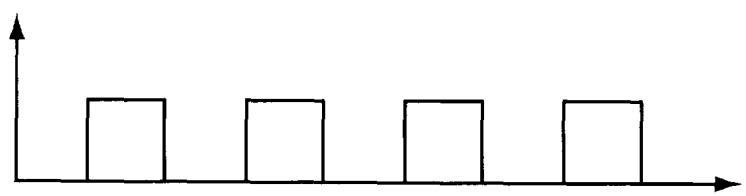
FIG. 9 is an output signal diagram relating to the optical encoder in FIG. 8.
Figure 9B:
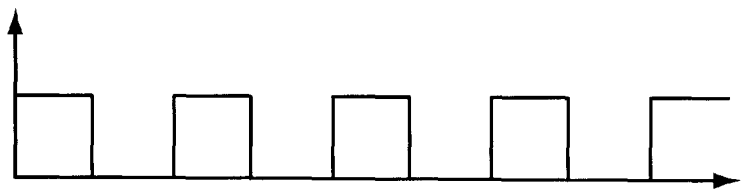

Therefore, the outputs of the photoreceptor elements 23A, 23B of the light-receiving section 2 are as shown in FIG. 9(a) and (b), respectively. In other words, when one of the photoreceptor elements 23A and 23B outputs a signal, the other photoreceptor element produces no output. FIG. 9 shows rectangular waveforms which were transformed from triangular waveforms of the photoreceptor elements 23A and 23B by a well-known signal processing circuit (not shown).

A fourth embodiment of the present invention is now described with reference to FIG. 10 and FIG. 11.

In this embodiment, instead of obtaining the first-type regions on the movable code plate by forming a series of V-shaped grooves, these regions are formed by matte finish.

Figure 10:
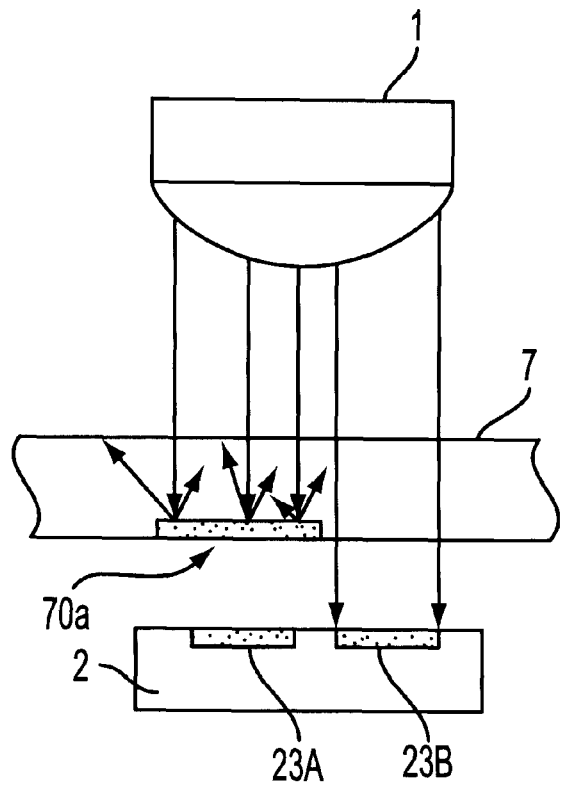
FIG. 10 is a diagram for explaining the light path changing function of a movable plate in a rotary-type optical encoder relating to a fourth embodiment of the present invention.
Figure 11:
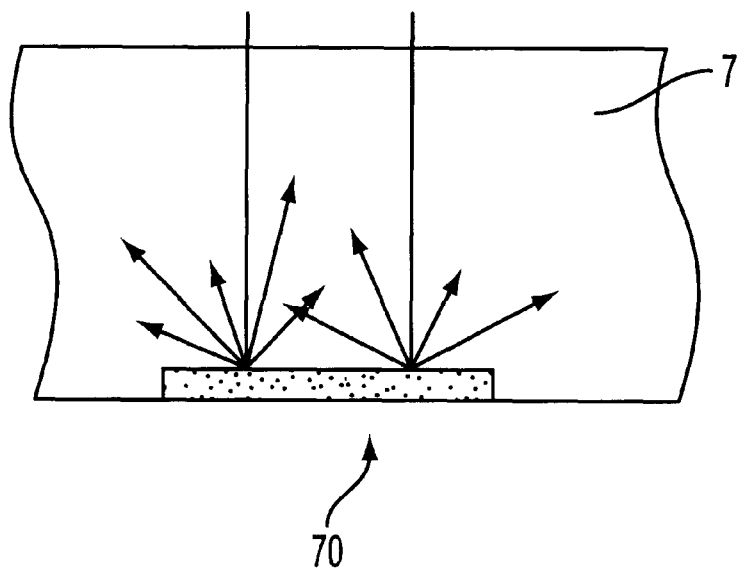
FIG. 11 is an enlarged view of the movable code plate in FIG. 10.

As shown in FIG. 10, when light from a light source 1 is incident on the movable code plate 7, this light is scattered at the first-type region 70a processed to have a matte finish, so that it does not reach the photoreceptor elements 23A, 23B of the light-receiving section 2. On the other hand, light that is incident on the second-type region 70b, which does not have a matte finish, travels on to the photoreceptor element 23B (or photoreceptor element 23A) of the light-receiving section 2.

By forming the first-type regions with a matte finish, it is possible further to reduce the depth of grooves formed in the movable code plate, compared to cases where the first-type regions are created by forming V-shaped grooves, and hence any decline in the strength of the movable code plate due to forming of the first-type regions can be further suppressed.

A fifth embodiment of the present invention is now described with reference to FIG. 12 and FIG. 13.

In the ring-shaped area of a movable code plate 8 scanned by a light-emitting element (omitted from drawing) of a light source 1, on the opposite side of the plate to the light source 1, portions where a series of V-shaped grooves are formed constitute a first-type region 80a, while portions where no grooves are formed constitute a second type region 80b.

Figure 12:
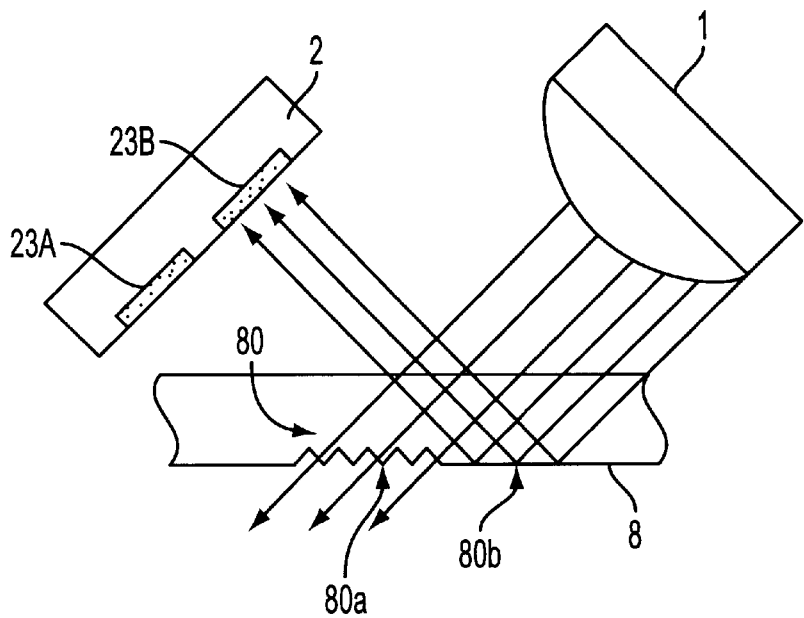
FIG. 12 is a diagram for explaining the light path changing function of a movable plate in a rotary-type optical encoder relating to a fifth embodiment of the present invention.
Figure 13:
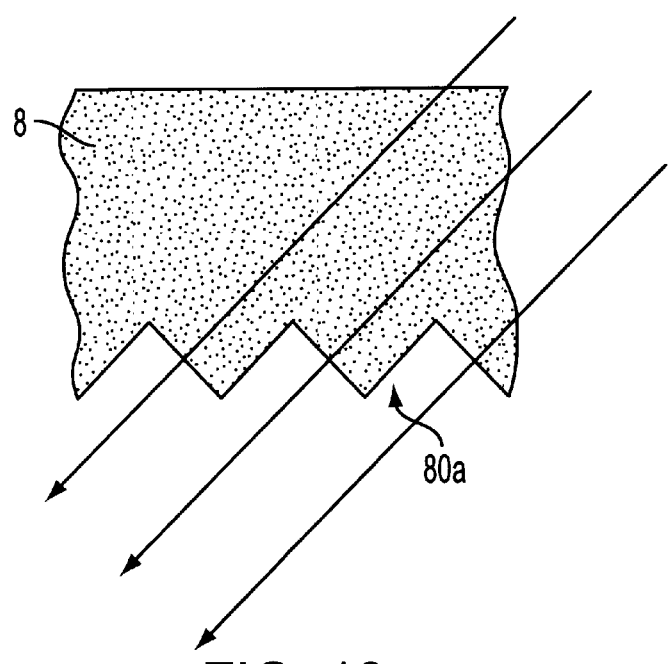
FIG. 13 is an enlarged view of the movable code plate in FIG. 12.

Light from the light source 1 is incident obliquely on the movable code plate 8, as illustrated in FIG. 12. In the first-type region 80a, this incident light is travelling in a perpendicular direction to the oblique faces of the V-shaped grooves, as illustrated in FIG. 13, and therefore the incident light is transmitted. On the other hand, in the second-type region 80b, the light is reflected at the face of the movable code plate 8 on the opposite side to the light source 1, as illustrated in FIG. 12, and hence the light enters the photoreceptor element 23B (or photoreceptor element 23A) of the light-receiving section 2.

The position of the light-receiving section 2 may be changed in such a manner that it receives light transmitted by the first-type region 80a.

Figure 14:
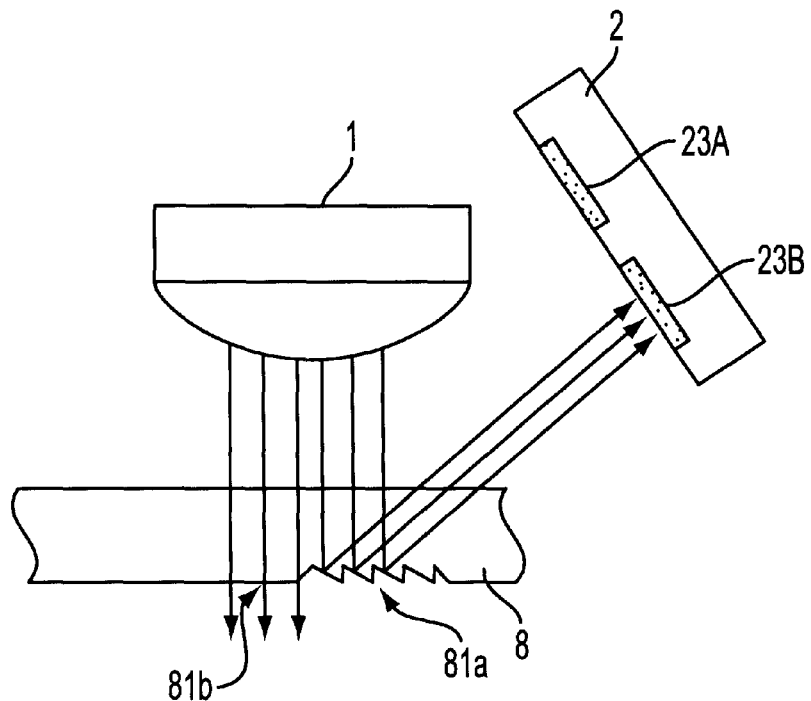
FIG. 14 is a diagram for explaining the light path changing function of a movable plate in a rotary-type optical encoder relating to a sixth embodiment of the present invention.

A sixth embodiment of the present invention is now described with reference to FIG. 14 and FIG. 15.

In the ring-shaped area of a movable code plate 8 scanned by a light-emitting element (omitted from drawing) of a light source 1, on the opposite side of the plate to the light source 1, portions where a series of V-shaped grooves are formed constitute a first-type region 81a, while portions where no grooves are formed constitute a second type region 81b.

Figure 15:
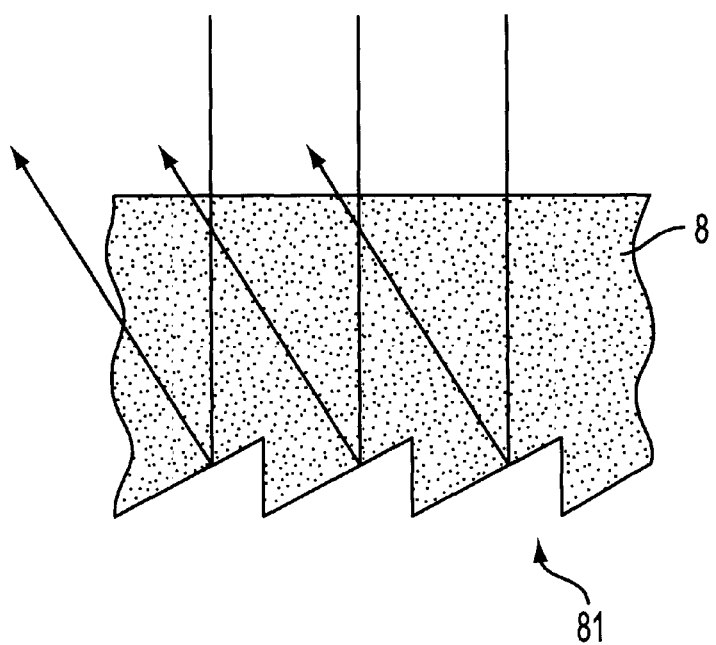
FIG. 15 is an enlarged view of the movable code plate in FIG. 14.

As shown in FIG. 15, the V-shaped grooves which constitute the first-type region 81a each comprise a single oblique face for reflecting incident light from the light source 1. The light reflected at the oblique faces of these V-shaped grooves enters the photoreceptor element 23B (or photoreceptor element 23A) of the light-receiving section 2.

On the other hand, in the second-type region 81b where none of the aforementioned V-shaped grooves are formed, the incident light from the light source 1 is transmitted by the movable code plate 8, and therefore it does not reach the photoreceptor elements 23A, 23B of the light-receiving section 2.

The position of the light-receiving section 2 may also be changed in such a manner that it receives light transmitted by the second-type region 81b.

Figure 16:
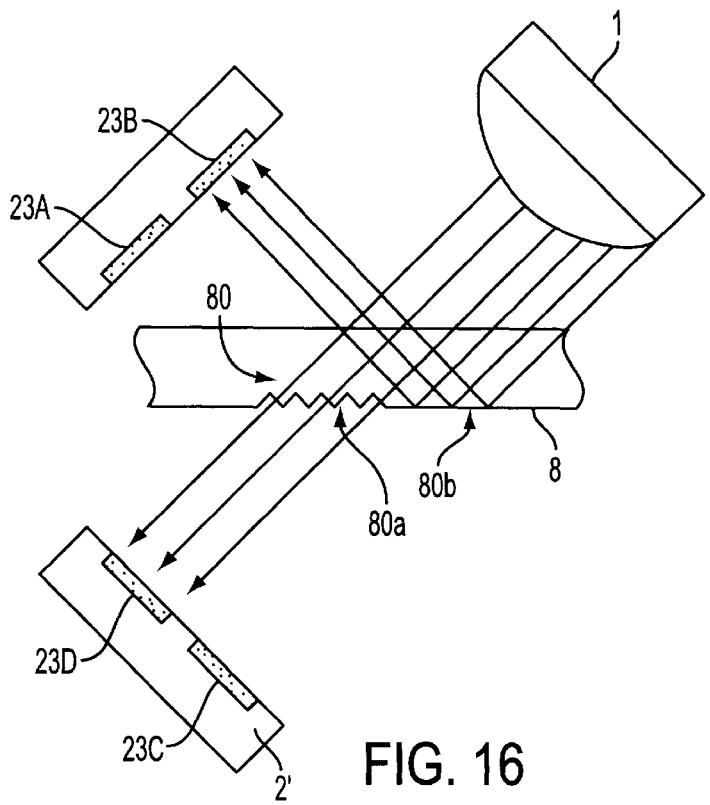
FIG. 16 is a diagram for explaining the light path changing function of a movable plate in a rotary-type optical encoder relating to a seventh embodiment of the present invention.

A seventh embodiment of the present invention is now described with reference to FIG. 16 and FIG. 17.

In this embodiment, light transmitted by the first-type region 80 in the fifth embodiment (FIG. 12) is also received by a further light-receiving section 2' which is separate from the light-receiving section 2. In other words, incident light from the light source 1 that is reflected by the second-type region 80b is received by the photoreceptor element 23B (or photoreceptor element 23A) of the light-receiving section 2, and furthermore, light that is transmitted by the first-type region 80a is received by a photoreceptor element 23D (or photoreceptor element 23C) of the light-receiving section 2'.

By using these two light-receiving sections 2, 2', it is possible to obtain complementary signals. Namely, since photoreceptor element 28A and photoreceptor element 23C, and photoreceptor element 23B and photoreceptor element 23D, output complementary signals, respectively, it is possible to raise detection accuracy.

Figure 17A:
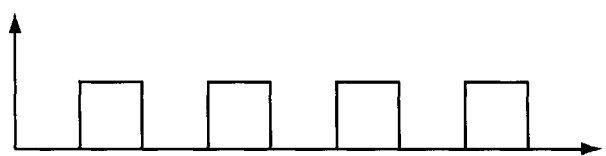
FIG. 17 is an output signal diagram relating to the optical encoder in FIG. 16.
Figure 17B:
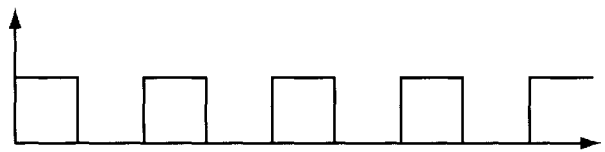
Figure 17C:
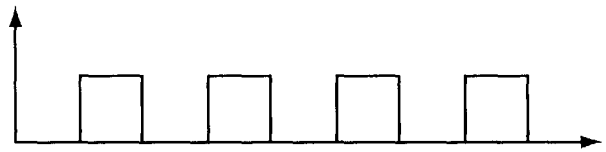
Figure 17D:

The outputs from photoreceptor elements 23A, 23B, 23C, 23D are as shown respectively in FIGS. 17(a), (b), (c), (d). FIG. 17 shows rectangular waveforms which were transformed from triangular waveforms of the photoreceptor elements 23A, 23B, 23C, 23D by a well-known signal processing circuit (not shown).

An eighth embodiment of the present invention is now described with reference to FIG. 18 to FIG. 20.

In the ring-shaped area of a movable code plate 9 scanned by a light-emitting element (omitted from drawing) of a light source 1, on the side of the, plate facing the light source 1, portions where a series of V-shaped grooves are formed constitute a first-type region 90a, while portions where no grooves are formed constitute a second type region 90b.

Figure 19:
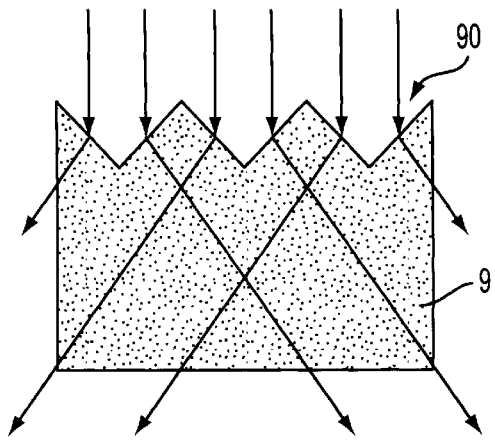
FIG. 19 is an enlarged view of the movable code plate in FIG. 18.

In the first-type region 90a where V-shaped grooves are formed, as illustrated in FIG. 19, incident light from the light source 1 is refracted in different directions by the left and right-hand oblique faces of the V-shaped grooves, and the refracted light is transmitted by the movable code plate 9.

The gradient of the V-shaped grooves formed in the first-type region 90a and the positioning of the photoreceptor elements 23A and 23B with respect to the movable code plate 9 are devised in such a manner that, when either of photoreceptor elements 28A or 23B comes directly under the first-type region 90a, the light refracted by the first-type region 90a and transmitted by the movable code plate 9 does not reach either of the photoreceptor elements 23A or 23B.

Figure 20A:
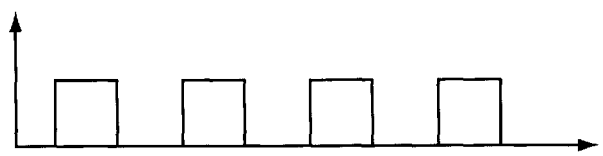
FIG. 20 is an output signal diagram relating to the optical encoder in FIG. 18.
Figure 20B:
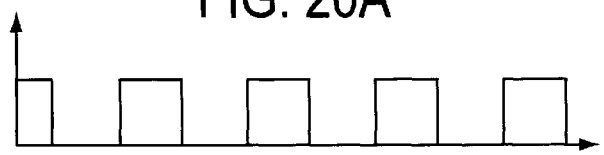

FIG. 20(a) shows the signal output by the photoreceptor element 23A when that photoreceptor element 23A comes directly under the second-type region 90b. FIG. 20(b) shows the signal output by photoreceptor element 23B when it comes directly under the second-type region 90b (at this time, the photoreceptor element 23A comes directly under the first-type region 90a and produces no signal). FIG. 20 shows rectangular waveforms which were transformed from triangular waveforms of the photoreceptor elements 23A and 23B by a well-known signal processing circuit (not shown).

Figure 21:
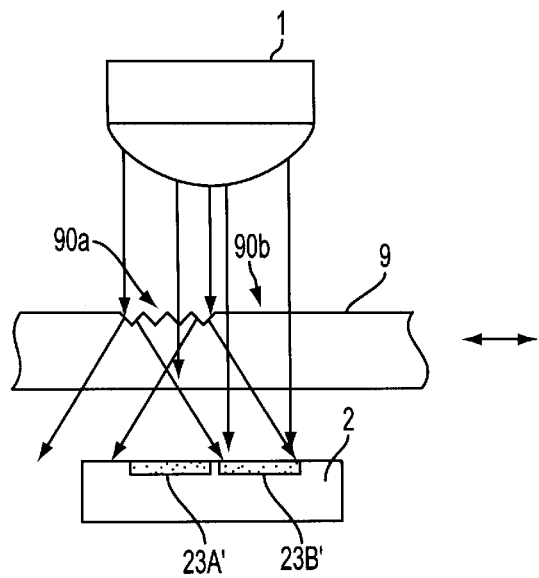
FIG. 21 is a diagram for explaining the light path changing function of a movable plate in a rotary-type optical encoder relating to a ninth embodiment of the present invention.

A ninth embodiment of the present invention is now described with reference to FIG. 21 and FIG. 22.

In the eighth embodiment described above, light refracted by the first-type region 90a where V-shaped grooves are formed is not received by either of the photoreceptor elements 23A, 23B of the light-receiving section 2, but this embodiment is devised such that this light is received by one or other of the photoreceptor elements.

Consequently, the intensity of the light received by the light-receiving section comprises a plurality of steps, depending on the positioning of the region where the V-shaped grooves are formed, and hence it is possible to obtain a signal corresponding to a position, by detecting the intensity of the received light. The photoreceptor elements 23A', 23B' of the light-receiving section 2 are positioned in such a manner that they can receive both a portion of the light refracted by the first-type region 90a, and the light travelling straight onwards through the second-type region 90b.

Figure 18:
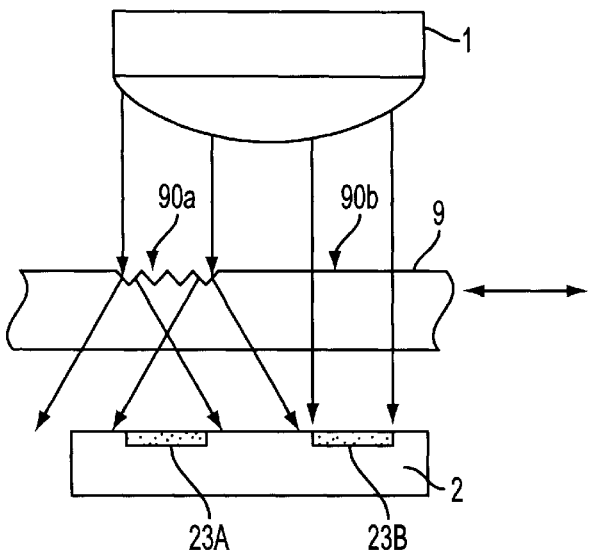
FIG. 18 is a diagram for explaining the light path changing function of a movable plate in a rotary-type optical encoder relating to an eighth embodiment of the present invention.
Figure 22A:
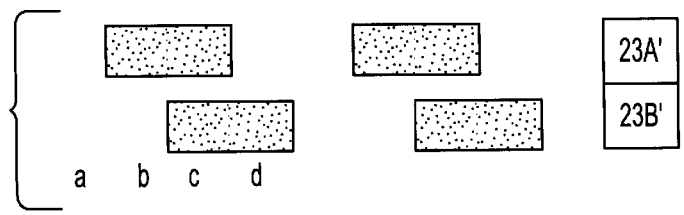
FIG. 22 is an output signal diagram relating to the optical encoder in FIG. 21.
Figure 22B:
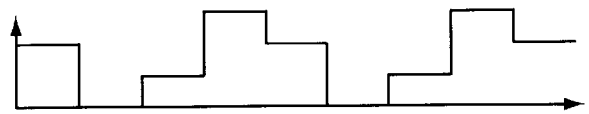
Figure 22C:
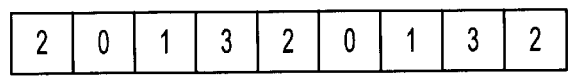
Figure 22D:
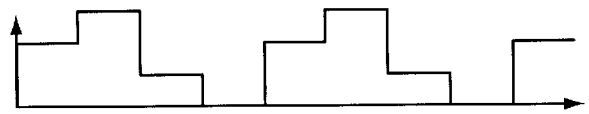
Figure 22E:
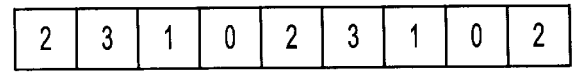
Figure 23:
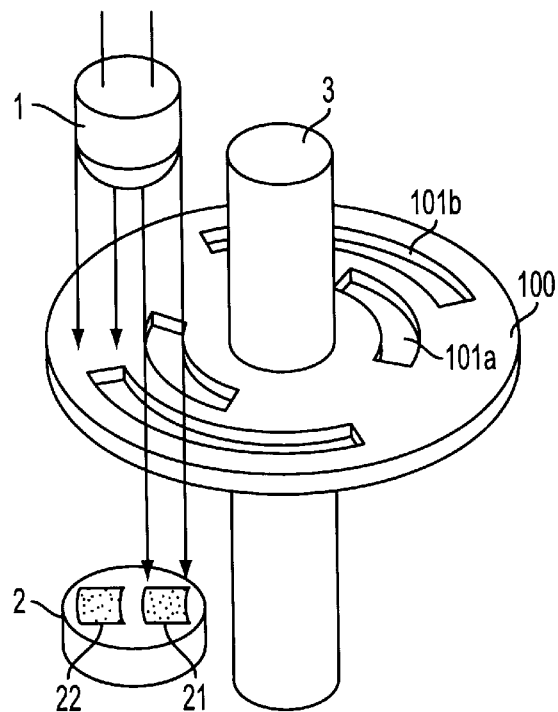
FIG. 23 is an approximate oblique view showing the principal composition of an optical detecting section in a conventional rotary-type optical encoder.
Figure 24:
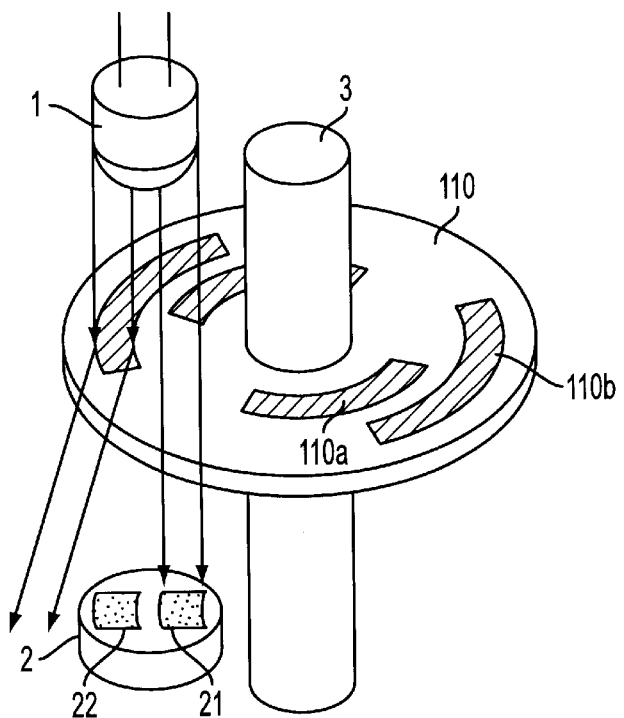
FIG. 24 is an approximate oblique view showing the principal composition of an optical detecting section in a rotary-type optical encoder relating to a conventional technology.

Supposing a case where the positioning of the photoreceptor elements 23A', 23B' of the light-receiving section 2 with respect to the movable code plate 9 is as shown in FIG. 22(a), (the movable code plate 9 having the same structure as the movable code plate 9 shown in FIG. 18,) then the intensity of light received by the photoreceptor elements 23A', 23B' will be as shown in FIGS. 22(c) and (e), respectively.

For example, let it be supposed that the first-type region 90a shown by diagonal hatching and the second-type region 90b shown as blank are positioned at a prescribed pitch over two columns on the movable code plate 9.

When light from the light-receiving section 1 is incident on the position on the movable code plate 9 indicated by "a", only light travelling directly through the second region 90b is incident at the photoreceptor elements 23A', 23B'.

When light from the light-receiving section 1 is incident on the position on the movable code plate 9 indicated by "b", no light is incident at the photoreceptor element 23A'. However, the light travelling directly through the second region 90b, and (a portion of) the light refracted by the first region 90a, is incident at the photoreceptor element 23B'. The intensity of this refracted light is weaker than the intensity of the direct light.

When light from the light-receiving section 1 is incident on the position on the movable code plate 9 indicated by "c", light refracted by the first-type region 90a directly above the photoreceptor element 23B' is incident at the photoreceptor element 23A', and light refracted by the first-type region 90a directly above the photoreceptor element 23A' is incident at the photoreceptor element 23B'.

When light from the light-receiving section 1 is incident on the position on the movable code plate 9 indicated by "d", then conversely to the case where it arrives at position "b", the photoreceptor element 23A' receives the light travelling directly through the second region 90b and also (a portion of) the light refracted by the first region 90a. The photoreceptor element 23B' receives no light.

Therefore, in this ninth embodiment, the intensity of the received light detected by the light-receiving section can be classified into four steps corresponding to position, thereby making it possible to determine a position by detecting the intensity of received light. FIGS. 22(c) and (e) show examples where the received light intensities in FIGS. 22(b) and (d) have been assigned numerical values, thereby making it possible to determine coded positions. Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical encoder comprising:
   a movable code plate;
   a light source; and
   a light-receiving section,
   wherein a scanning region of said movable code plate that is scanned by incident light from said light source comprises
      regions of a first type wherein said incident light is either transmitted through said scanning region, reflected or scattered to follow a first light path, and
      regions of a second type wherein said incident light is either transmitted through said scanning region or reflected to follow a second light path, which is different from the first light path,
   wherein said light-receiving section is located in a position to receive light following at least one of either said first light path and said second light path, and
   wherein each of said regions of a first type comprises a series of indentations on one face of said movable code plate.

2. The optical encoder according to claim 1, wherein said movable code plate comprises a transparent plate made from glass or plastic, and said regions of a second type are the areas on the transparent plate where said series of indentations are not formed.

3. The optical encoder according to claim 1, wherein said movable code plate comprises a circular plate, said scanning region has a ring shape, and said regions of a first type and said regions of a second type are arranged alternately at a prescribed pitch on said ring-shaped scanning region in the circumferential direction thereof.

4. The optical encoder according to claim 1, wherein said series of indentations comprises a series of V-shaped grooves.

5. The optical encoder according to claim 4, wherein the oblique faces of said V-shaped grooves are formed in such a manner that light from said light source incident on said regions of the first type is reflected totally in the direction of a first light path.

6. The optical encoder according to claim 4, wherein the oblique faces of said V-shaped grooves are formed in such a manner that light from said light source incident on the regions of the first type is transmitted in the direction of a first light path.

7. The optical encoder according to claim 1, wherein said light-receiving section comprises a plurality of photoreceptor elements arranged at prescribed intervals, and said regions of a first type and said regions of a second type are arranged alternately at a prescribed pitch, in accordance with the interval between said photoreceptor elements.

8. The optical encoder according to claim 1, wherein said plurality of indentations are formed by a process producing a matte finish.

9. An optical encoder comprising:
   a light source to provide a light;
   a light-receiving section disposed to receive the light following at least one of a first light path and a second light path; and
   a movable code plate disposed between said light source and said light-receiving section, said movable code plate comprising first regions and second regions,
   wherein the light incident on the first region is altered to follow the first light path, and light incident on the second region is altered to follow the second light path different from the first light path, and
   wherein each of the first and/or second regions comprises a rough surface so as to alter incident light to follow the respective first or second light path.

10. The optical encoder of claim 9, wherein the rough surface comprises indentations on a face of said movable code plate.

11. The optical encoder of claim 10, wherein the indentations are disposed in rows.

12. The optical encoder of claim 11, wherein the rows of indentations are parallel.

13. The optical encoder of claim 11, wherein the rows of indentations are not-parallel.

14. The optical encoder of claim 11, wherein the rows of indentations comprise V-shaped grooves.

15. The optical encoder of claim 14, wherein each V-shaped groove comprises a first and second side, and wherein the first side is longer than the second side.

16. The optical encoder of claim 9, wherein the rough surface comprises a matte finish applied to a face of said movable code plate.

17. The optical encoder of claim 9, further comprising a second light-receiving section, wherein light on the second light path is received by said second light-receiving section, and light on the first light path is received by said light-receiving section.

18. The optical encoder of claim 17, wherein the rough surface comprises indentations on a face of said movable code plate.

19. The optical encoder of claim 18, wherein the indentations are disposed in rows.

20. The optical encoder of claim 19, wherein the rows of indentations comprises V-shaped grooves.

* * * * *

UNITED STATES PATENT AND TRADEMARK OFFICE
CERTIFICATE OF CORRECTION

PATENT NO. : 6,232,593 B1
DATED : May 15, 2001
INVENTOR(S) : Mitsuyuki Taniguchi, et al.

It is certified that error appears in the above-identified patent and that said Letters Patent is hereby corrected as shown below:

Title page,
Item [73], change "Minamitsuru" to -- Yamanashi --.
Item [56], change "4,536,650" to -- 4,536,650A --; and change "5,124,548" to -- 5,124,548A --.

Column 2,
Line 6, change "11-201229" to -- 11-201779 --.

Column 3,
Line 8, change "moulds" to -- molds --.

Column 6,
Line 13, change "24" to -- 24A --.

Column 7,
Line 49, change "28A" to -- 23A --.

Signed and Sealed this

Twelfth Day of February, 2002

Attest:

JAMES E. ROGAN
Attesting Officer
Director of the United States Patent and Trademark Office